Figure 1:
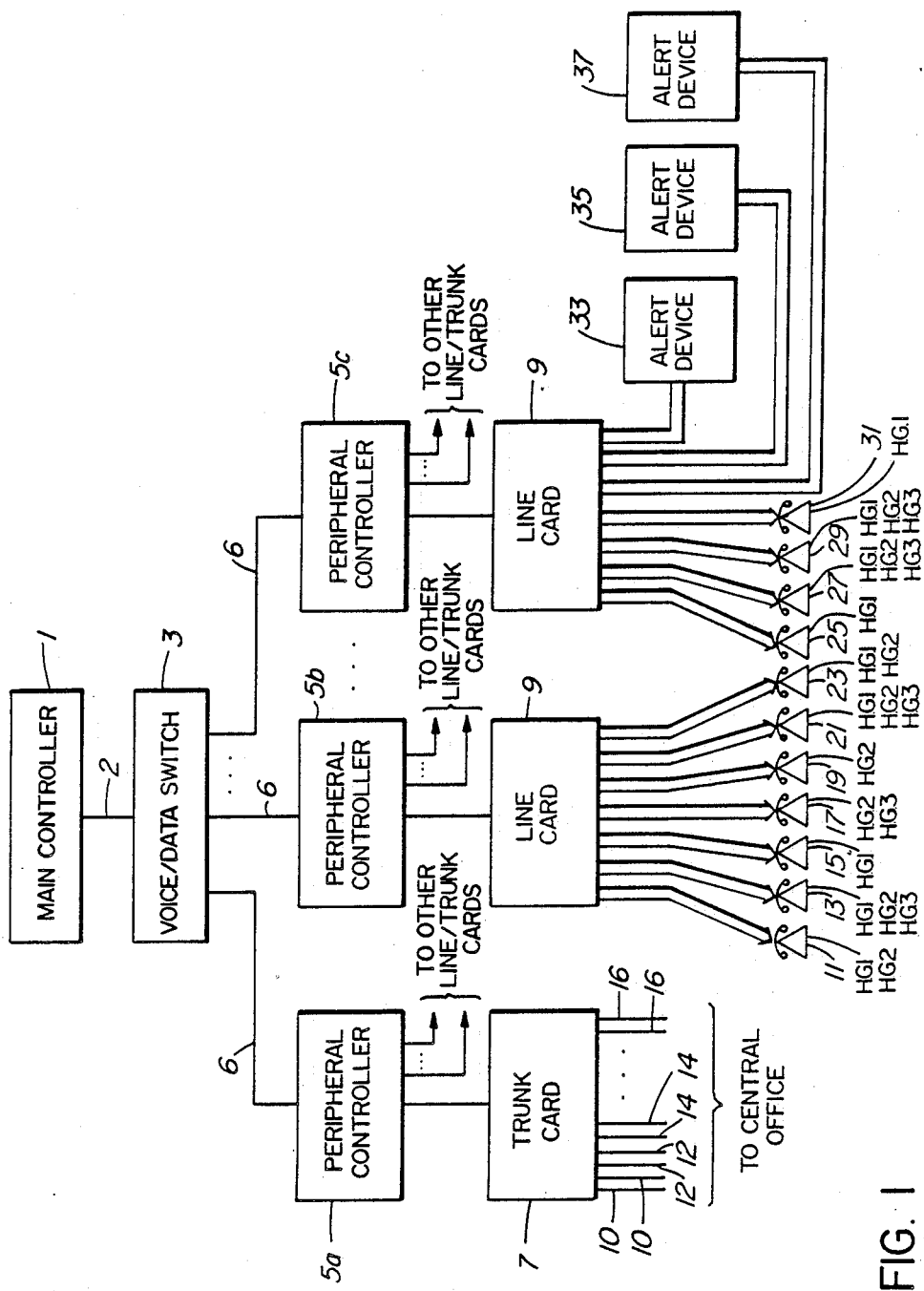

United States Patent [19]

Pinard

[11] Patent Number: 4,964,155
[45] Date of Patent: Oct. 16, 1990

[54] PROGRAMMABLE THRESHOLD ALERT

[75] Inventor: Debbie Pinard, Ontario, Canada

[73] Assignee: Mitel Corporation, Ontario, Canada

[21] Appl. No.: 323,374

[22] Filed: Mar. 14, 1989

[51] Int. Cl.⁵ .............................................. H04M 3/50
[52] U.S. Cl. .................................... 379/136; 379/140; 379/266
[58] Field of Search ............... 379/136, 133, 134, 135, 379/140, 214, 266

[56] References Cited

U.S. PATENT DOCUMENTS 4,408,100 10/1983 Pritz et al. ........................... 379/136

Primary Examiner—Stafford D. Schreyer
Attorney, Agent, or Firm—Antonelli, Terry, Stout & Kraus

[57] ABSTRACT

In a communication system, a programmable threshold alert system for indicating to a hunt group supervisor the relative number of incoming unanswered calls in a hunt group. Circuitry is provided for detecting the number of calls waiting to be answered and in response generating a level value signal representing the percentage of calls waiting relative to the number of active call answer stations. The level value signal is compared to one or more threshold values in response to which an output signal is generated for indicating the magnitude of the level value signal relative to the one or more threshold values, thereby providing an indication of the load on the hunt group.

13 Claims, 2 Drawing Sheets

PROGRAMMABLE THRESHOLD ALERT

This invention relates in general to communication systems, and more particularly to an apparatus and method for indicating the number of incoming calls waiting relative to the number of active call answer stations in a hunt group.

Telephone call answering systems are well known in which switching equipment is utilized for regulating distribution of incoming telephone calls to call answer stations on a priority or non-priority basis. The call answer stations are typically arranged in hunt groups associated with respective trunk lines carrying the incoming calls.

It is well known to provide visual identification means for alerting a supervisor and/or agent within the hunt group when the number of incoming calls on hold surpasses a predetermined threshold limit.

Typical prior art threshold alert systems utilize circuitry for counting the number of incoming calls camped-on to a specific hunt group (ie. incoming calls on hold). In the event that the detected number of incoming camped-on calls exceeds a predetermined threshold value, a light is activated or an LED is flashed on the supervisor's subscriber set. In this way, the supervisor is able to monitor the incoming call throughput of the hunt group.

Such prior art threshold alert systems are based on the absolute value of the number of incoming calls on hold irrespective of the number of agents or call answer stations which are active (ie. available) within the hunt group to answer the calls. Thus, there is little indication as to the severity of the threshold alert since a queue of incoming calls against a hunt group comprised of a large number of active stations is less severe than an alert for the same number of calls against a hunt group with a small number of active stations.

The size of a hunt group placing their sets into "do not disturb" or "make busy" modes. Thus, prior art threshold alert systems also provide no indication of the severity of the threshold alert in relation to the fluctuating number of active agents.

According to the present invention, an apparatus and method is provided for indicating the number of incoming calls waiting relative to the number of active stations. Thus, a true indication is provided of the severity of the incoming call threshold alert.

In general, according to the present invention, there is provided an incoming call threshold alert system for use in a communication system comprised of a predetermined number of active call answer stations for receiving incoming calls. The system is comprised of circuitry for detecting the number of calls waiting to be answered and in response generating a level value signal representing the percentage of the number of calls waiting relative to the predetermined number of active call answer stations, and circuitry for receiving and comparing the level value signal to one or more threshold values and in response generating an output signal for indicating the magnitude of the level signal value relative to the one or more threshold values.

According to the present invention, there is also provided a method of indicating the number of incoming calls received in a communication system relative to the number of active call answer stations within the system, comprising the steps of detecting the number of calls waiting to be answered and in response generating a level value signal representing the percentage of the number of calls waiting relative to the predetermined number of active call answer stations, receiving and comparing the level value signal to one or more threshold values and in response generating an output signal for indicating the magnitude of the level value signal relative to the one or more threshold values, thereby providing an indication of the number of calls waiting relative to the number of active stations.

Figure 2:
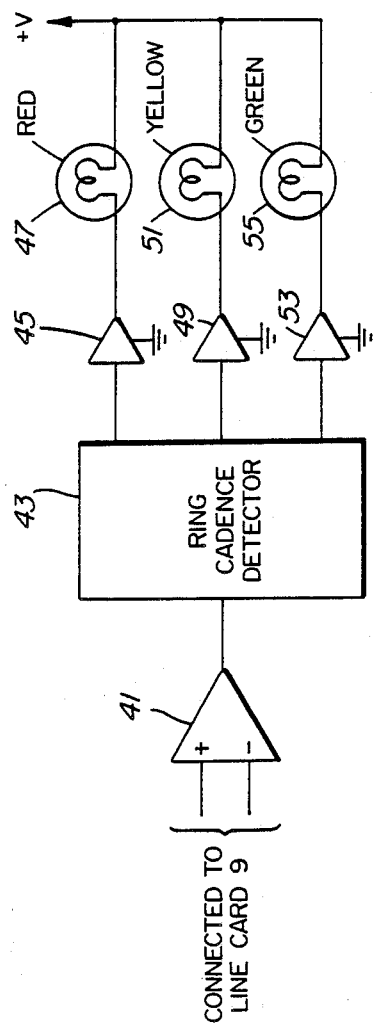

A better understanding of the present invention will be obtained with reference to the detailed description below in conjunction with the following drawings in which:

FIG. 1 is a general block diagram illustrating a communication system comprised of a plurality of trunk lines and call answering stations arranged in respective hunt groups, and a plurality of alert devices in accordance with the present invention, and FIG. 2 is a block schematic diagram of a representative alert device, in accordance with a preferred embodiment of the present invention.

Turning to FIG. 1, a communication system such as a PABX, is shown connected to a plurality of trunk lines 10, 12, 14 . . . 16 for receiving calls from a remote central office or PABX (not shown), and routing the calls to a plurality of call answering stations.

The basic system consists of a main controller 1, which controls the operation of the entire system, (ie. keeping track of established message paths, setting up new paths, and receiving and sending supervisory and control messages related to the progress of each requested and established call).

The main controller 1 is connected via one or more high speed 16 bit parallel data buses 2 to a voice and data switch network or controlled matrix 3.

The switch 3 is connected to one or a plurality of peripheral controllers 5A, 5B . . . 5C via serial data lines or links 6. The peripheral controllers are connected to a plurality of peripheral interfaces such as trunk card 7 and line cards 9 to which peripheral units such as trunk lines 10, 12, 14 . . . 16, call answering stations 11, 13, 15 . . . 31, and threshold alert display devices 33–37 are connected.

The links 6 between the peripheral controllers 5A, 5B . . . 5C and switch 3 are preferably serial links, (eg. 32 channels operating at 2.048 MHZ per second).

The call answering stations are arranged into a plurality of hunt groups, such as H.G.1, H.G.2, and H.G.3. In other words, incoming calls assigned to a predetermined hunt group (eg. H.G.1) will be routed for answering by the stations which have been assigned to that hunt group (ie. stations 11, 13, 15, 21, 23, 27, 29 and 31).

The threshold alert display devices 33, 35 and 37 are provided for indicating to respective hunt group supervisors for hunt groups H.G.1, H.G.2 and H.G.3, the number of incoming calls which have been queued for answering in relation to the number of active call answering stations within the respective hunt groups.

The system operates as follows, taking as an example the answering of a call from a trunk. The peripheral controllers 5A, 5B . . . 5C continuously scan the line and trunk cards for service requirements (ie. the presence of supervisory signals presented to the line or trunk card by a call answering station). In the case of a request for a connection of an incoming call on a trunk (eg. trunk line 12) to one of the hunt groups (eg. H.G.1), the presence of ringing signal on trunk line 12 produces a supervisory request for service signal to the associated peripheral controller, (eg. controller 5A), in a well known manner. In response, the peripheral controller 5A sends a message signal via link 6, switch 3, and bus 2 to the main controller 1. The main controller retains a memory map of possible connections (circuits) of the incoming call on trunk line 12 to the assigned one of the hunt groups H.G.1-H.G.3. Thus, in the event that the incoming call is to be routed to H.G.1, the main controller 1 selects an idle one of the call answering stations assigned to H.G.1 (eg. station 29), and then sends a message through voice and data switch 3 to peripheral controller 5C to cause the idle answering station 29 to ring, and to set up a circuit within the peripheral control unit network between the answering station and the trunk line 12.

The peripheral controller 5C continuously scans the call answering stations 25-31 for the presence of supervisory signals such that when the operator goes off-hook at station 29 for answering the incoming call, the peripheral controller 5C sends a message via switch 3 to the main controller 1 for ceasing the application of ringing signal and connecting the station 29 to the trunk line 12 for answering the call.

The peripheral controller 5C continues to scan the peripheral interfaces (ie. line cards 9) for conclusion of the call, and the connection of the links is severed when an on-hook condition is sensed at station 29. In a similar manner as described above supervisory messages are sent to the main controller 1 via the message switch 3, which in response disconnects the trunk 12 and call answering station 29 by means of generating a further instruction message signal to the switch 3.

According to the present invention, main controller 1 executes a predetermined call process denoted as CPACDP for periodically updating the threshold alert devices 33-37 for indicating the load on respective ones of the hunt groups H.G.1 to H.G.3 associated with the threshold alert devices 33-37. This provides a supervisor and/or agent of each hunt group with a visual indication of the alert level (ie. the number of calls waiting on the hunt group relative to the number of agents in that group).

The CPACDP process updates the threshold alert devices 33-37 on a periodic timer basis, (eg. once every 60 seconds). However, if a peak or valley in the aforementioned alert level occurs between the periodic timer interval, then the threshold alert display device is updated immediately and the periodic timer is restarted. Therefore, the periodic timer window can slide forward in time depending on the queue status. A peak is defined as when the alert level goes over a predetermined high threshold level, and a valley is defined as when the alert level goes below a predetermined low threshold level.

The pseudo-code listing for a first procedure within CPACDP for establishing a message timer interval and controlling message exchange is a follows:

```
WHILE true DO
    start a message timer for 15
    seconds
    IF message received
        THEN
            CASE msg_function_code OF
                timer_a_exp:
                    restart message timer
                    check status of agent groups
            neg ack, abort, answer:
                handle device failure
            pos ack, clear:
                no action
            OTHERWISE
                log unexpected message
            ENDCASE:
    ELSE
        log an error
    ENDIF; message received
ENDWHILE:
```

Thus, the first CPACDP procedure establishes a 15 second message timer interval during which messages are received and logged by the CPACDP process in a recurring manner. The specific message signals are discussed in greater detail below.

The CPACDP process executes a second procedure for looping through all of the hunt group H.G.1, H.G.2, and H.G.3, and for each hunt group comparing the last status condition with the present status of the hunt group and in response sending the corresponding one of the threshold alert display devices 33-37 a signal if required and a real time group report if necessary. The real time report depends on whether the status has changed or the length of time since the last report for the group. A third CPACDP procedure is described in greater detail below.

The pseudo code listing for the second CPACDP procedure is as follows:

```
FOR min_ansdvc-group TO abs_max_ansdvc
    group DO
        find the hunt group data table
        IF first_threshold < > second_threshold
            [thresholds are only equal when not
            programmed]
            THEN increment rt counter in alert
            status table
                [if this one has a device ringing,
                stop it now]
                IF alert swid is ringing
                    THEN send release message (alert
                        swid);
                ENDIF;
        calculate current status
            (group swid, current status);
            IF current_status < > last_
            status <in table>
        THEN
            send status signal (alert swid,
            current status);
            last status :=current status;
            send rt group report(group swid,calls
            waiting, free agents);
            set rt counter to 0 to restart report
            timing
        ORIF rt counter = 4
        THEN <it's been a minute since the last
            report>
            send rt group report(group
            swid,calls waiting, free agents);
            set rt counter to 0 to restart report
            timing
        ENDIF;
        ENDIF; <thresholds not equal>
        increment index for loop
ENDFOR;
```

Thus, the second CPACDP procedure checks to see that the high and low thresholds have been programmed into each hunt group, calculates the current status (discussed in greater detail below with reference to the third procedure), and in the event the status has changed (ie. a peak or valley has been hit) or the periodic timer has expired, sends a status signal to the appropriate threshold alert display device 33-37, as discussed in greater detail below with reference to a fourth CPACDP procedure.

The third procedure within CPACDP for computing the status of each of the hunt groups is represented in pseudo code format, as follows:

```
count free agents(group swid,free agents);
read dam device queue size(group swid,
    camped on count calls waiting)
IF calls waiting = 0
THEN level := 0;
ORIF free agents = 0
THEN level :=max threshold level;
ELSE level :=(Calls waiting*100)/free
                                    agents;
ENDIF;
current status :+ red:
get hunt group data ptr
IF level < second threshold
THEN current status :=green;
    ELSE current status :=yellow;
    ENDIF ;
ENDIF
```

Thus, the third CPACDP procedure counts the number of active of free agents (ie. agents that are not busy and not in "make-busy" or "do not disturb" modes), measures the incoming call queue on the hunt group and in response generates an alert level value representative of the load on the hunt group relative to the number of free active agents. The level value is compared to the high and low threshold levels and the current status (ie. red, yellow or green) is generated.

Finally, the fourth procedure for sending the status signal from the main controller 1 to the associated threshold alert display device 33-37 is represented in pseudo-code as follows.

```
IF swid is ONS device
    AND
    swid to smid is valid
    THEN
    format msg 2 pp(seize connect ring,
        msg out,msid,active
        pid) ;
    IF status = red
    THEN ring type := callback ringing
    ORIF status = yellow
    THEN ring type := ext ringing;
    ELSE ring type := int ringing;
    ENDIF ;
    set up my channels in mesg data
    send message to peripheral
ELSE
    log an error
ENDIF ; swid and msid valid
```

Thus, in operation, the line card 9 is updated on a periodic timer basis (eg. 60 seconds). However, in the event that a peak or valley occurs during the 15 second message timer interval, the alerting device 33-37 is updated immediately, the line card 9 is updated, and the periodic timer is restarted.

Consider an example in which there are 10 active members in a hunt group and the first or low threshold level is set at 20%, and the second or high threshold level is set at 70%. The first through third CPACDP procedures are executed during the first interval time of 15 seconds. In the event that after the first interval check (15 seconds) there are two calls camped-on to the hunt group, nothing is done, and the CPACDP procedures are re-executed. Assume that at the next interval, (30 seconds) there are 6 calls waiting, still nothing is done. However, if at the next 15 second interval (ie. 45 seconds) there are 10 calls waiting, the alert level will have crossed a peak such that the current status changes from green to red and a status signal is sent via the fourth CPACDP procedure. In particular, controller 1 generates a seize connect ring message signal for transmission to the associated line card (eg. line card 9) which results in double burst ringing to the associated one of the threshold alert devices 33-37. Also, according to the second CPACDP procedure the periodic timer is reset.

At the next interval (ie. 60 seconds) in the event that there are 6 calls waiting, nothing is done. If at the next interval time (75 seconds) there is only 1 call waiting, this means that the alert level has crossed a valley, and the line card 9 is idled by means of the fourth CPACDP procedure within main controller 1 generating a release message signal to line card 9. The periodic timer is again reset. In the event that the queue does not go over the second threshold level during any of the 15 second timer intervals comprising the next period timer interval, (ie. by 125 seconds) the line card 9 is updated to reflect the maintained current status.

A pictorial representation of the above example follows, in thich the periodic timer is 10 seconds and interval timer is 15 seconds, is follows:

| time | 0 | 15 | 30 | 45 | 60 | 75 | 90 | 105 | 120 | 135.. |
|---|---|---|---|---|---|---|---|---|---|---|
| calls | | 2 | 6 | 10 | 6 | 1 | 1 | 3 | 3 | 3 |
| 60s | | | | | | | | | | |
| ONS update | ↑ | | | ↑ | | ↑ | | | | ↑ |

Using the process of the present invention, hunt group supervisors and agents will be advised when their queues are backing up and when the agents have done their jobs and cleared them.

Since percentages are used rather than numbers, the method according to the present invention more accurately reflects the actual queue status thanprior art systems which use the number of calls camped-on to determine when queues are backing up.

Turning briefly to FIG. 2, a block schematic diagram is shown of a threshold alert display device such as 33-37, in accordance with the preferred embodiment of the present invention.

An output of line card 9 (eg. tip and ring lead pair) is connected to the non-inverting and inverting inputs of a differential amplifier 41. The output of amplifier 41 is connected to the input of a ring cadence detector 43. The ring cadence detector 43 is a well known device comprised of threshold detection circuits, counters and other analog and digital logic circuitry for detecting various ringing cadences generated by the line card 9 and received via amplifier 41.

In operation, in the event the current status is red (ie. the calculated level or load on the hunt group is higher than the second programmable threshold), main controller 1 generates a status signal for invoking call-back ringing signal generation by line card 9. The call-back ringing signal is received by differential amplifier 41 and isapplied to the ring cadence detector 43. The detector 43 performs a counting and amplitude level detection routine for identifying the call-back ringing cadence and in response generates and transmits a first enable signal to driver circuit 45. The driver circuit 45 is connected to a lamp 47 (eg. red traffic light lamp) which in turn is connected to a source of power supply voltage +V. In response to receiving the enable signal from ring cadence detector 43, driver circuit 45 establishes a circuit path from the supply voltage +V through the red lamp 47 to circuit ground, thereby activating the red lamp 47.

Similarly, in the event the current status is yellow (ie. the calculated level is below the second threshold but above the first threshold), line card 9 is seized and generates external ringing cadence. The ring cadence detector 43 receives and detects the external ringing cadence and generates a second enable signal for application to driver circuit 49 which, in response causes illumination of a yellow or amber lamp 51.

Likewise, in the event the current status is green (ie. the calculated level is less than the first programmable threshold), an internal ringing signal is generated by the line card 9 for causing a further enable driver circuit 53 to establish a circuit path between the +V voltage source and ground, through a green lamp 55.

A person understanding the present invention may conceive of other embodiments or variations therein.

For example, as an alternative to using a traffic lamp interface, it is contemplated that the threshold alert display devices 33-37 may be in the form of predetermined line buttons on proprietary subscriber sets of the telephone system. In such an embodiment the various ringing cadences generated by the line card would be reflected in the status of an LED indicator associated with the line button used to display the status of the group.

All such embodiments or variations are believed to be within the sphere and scope of the present invention as defined by the claims appended hereto.

The embodiments of the invention in which an exclusive property or privilege is claimed are defined as follows:

1. In a communication system comprised of a predetermined number of call answer stations for receiving incoming calls, an incoming call threshold alert system, comprised of:
   (a) means for detecting the number of said incoming calls waiting to be answered and the number of free call answer stations, and in response generating a level value representing the percentage of said number of calls waiting to be answered relative to said number of free call answer stations,
   (b) means for receiving and comparing said level value to one or more threshold values and in response generating an output signal for indicating magnitude of said level value relative to said one or more threshold values, thereby providing an indication of said number of calls waiting relative to said number of free stations.

2. An incoming call threshold alert system as defined in claim 1, wherein said means for detecting is comprised of:
   (a) first means for sensing the number of incoming calls unanswered and in response generating a first number value indicative of said number of calls waiting,
   (b) second means for sensing which of said call answer stations are free and in response generating a further number value indicative of said number of free stations, and
   (c) means for receiving said first and further number values and in response generating said level value equal to said first number value divided by said further number value multiplied by 100.

3. An incoming call threshold alert system as defined in claim 2, wherein said means for receiving is comprised of:
   (a) a line circuit for receiving said output signal and in response generating a predetermined ringing signal characterized by a distinctive cadence designative of said magnitude of said level value, and
   (b) means connected to said line circuit for receiving said ringing signal and in response illuminating one or more visual indicators, thereby providing a visual indicating of said number of said incoming calls waiting to be answered relative to said number of free call answer stations.

4. An incoming call threshold alert system as defined in claim 3, wherein said line circuit is an on-premise PABX port and said one or more visual indicators are comprised of traffic lights connected to said port.

5. An incoming call threshold alert system as defined in claim 2, wherein said means for receiving is comprised of a proprietary PABX subscriber set for receiving said output signal and in response illumining an LED indicator thereon, thereby providing a visual indication of said number of calls waiting relative to said number of active stations.

6. An incoming call threshold alert system as defined in claim 1, further including a first timer means for enabling generation of said level value in accordance with a first time interval and second timer means for enabling generation of said output signal in accordance with a second time interval longer than said first time interval.

7. An incoming call threshold alert system as defined in claim 6, further including means for enabling generation of said output signal according to a further time interval which is greater than or equal to said first time interval and less than said second time interval in the event said level value changes within one of said second time intervals between a magnitude which is greater than a first one of said threshold values and a magnitude which is less than a second one of said threshold values.

8. An incoming call threshold alert system as defined in claim 7, wherein said first threshold value is 70, said second threshold value is 20, said first time interval is 15 seconds and said second time interval is 60 seconds.

9. In a communication system comprised of a predetermined number of active call answer stations for receiving incoming calls, a method of indicating the number of said incoming calls waiting relative to said number of active stations, comprising the steps of:
   (a) detecting the number of said calls waiting to be answered, and in response generating a level value representing the percentage of said number of calls waiting relative to said predetermined number of active call answer stations, and
   (b) receiving and comparing said level value to one or more threshold values and in response generating an output signal for indicating magnitude of said load value relative to said one or more threshold values, thereby providing an indication of said number of calls waiting relative to said number of active stations.

10. A method as defined in claim 9, further comprising the steps of:

(c) sensing successive ones of said incoming calls and in response generating a first number value indicative of said number of calls waiting, (d) sensing which of said call answer stations are active and in response generating a further number value indicative of said number of active stations, and (e) receiving said first and further number values and in response generating said level value equal to said first number value divided by said further number value multiplied by 100.

11. A method as defined in claim 10, further comprising the steps of:

(f) receiving said output signal and in response generating a predetermined ringing signal characterized by a distinctive cadence designative of said magnitude of the level value, and (g) receiving said ringing signal and in response illumining one or more visual indicators, thereby providing a visual indication of said number of calls waiting relative to said number of active stations.

12. A method as defined in claim 9, further comprising the steps of;

(c) enabling generation of said level value in accordance with a first time interval, and (d) enabling generation of said output signal in accordance with a second time interval longer than said first time interval.

13. A method as defined in claim 12, further comprising the step of enabling generation of said output signal according to a further time interval which is greater than or equal to said first time interval and less than said second time interval in the event said level value changes within one of said second time intervals between a magnitude which is greater than a first one of said threshold values and a magnitude which is less than a second one of said threshold values.

* * * * *